United States Patent [19]
Wilson

[11] 3,861,702
[45] Jan. 21, 1975

[54] TRANSPORT CART

[75] Inventor: James D. Wilson, Garden Grove, Calif.

[73] Assignee: Banner Metals, Inc., Compton, Calif.

[22] Filed: Nov. 20, 1972

[21] Appl. No.: 307,813

[52] U.S. Cl. ........ 280/33.99 H, 16/35 R, 280/47.35, 280/79.3, 280/408
[51] Int. Cl. ............................................. B62b 11/00
[58] Field of Search ................ 280/33.99 C, 33.99 S, 33.99 R, 280/33.99 A, 33.99 F, 33.99 T, 408, 47.35, 280/47.34, 79.1, 79.2, 79.3, 29, 32.6; 16/35 R

[56] References Cited
UNITED STATES PATENTS

| | | | |
|---|---|---|---|
| 2,544,924 | 3/1951 | Herold | 16/35 R X |
| 2,928,681 | 3/1960 | Wilson | 280/33.99 S |
| 2,992,010 | 7/1961 | Sides | 280/33.99 S |
| 3,027,174 | 3/1962 | Garbarino | 280/33.99 H |
| 3,052,484 | 9/1962 | Huffman et al. | 280/47.35 X |
| 3,809,202 | 5/1974 | Tyszkiewicz | 280/33.99 C X |

Primary Examiner—David Schonberg
Assistant Examiner—Milton L. Smith
Attorney, Agent, or Firm—Jessup & Beecher

[57] ABSTRACT

An improved vehicle is provided in the form of a wheeled transport cart which may be towed in a train of similar carts for transporting groceries, or other commodities, around a warehouse, or the like. The transport cart of the invention is constructed with a hinged bottom which may be turned up when the cart is empty to permit the cart to be nested with similar carts when not in use so as to conserve space. When the bottom is turned down to receive a load, one of the wheels or casters is locked in a particular angular position to prevent the cart from zig-zaging or drifting when it is towed.

6 Claims, 9 Drawing Figures

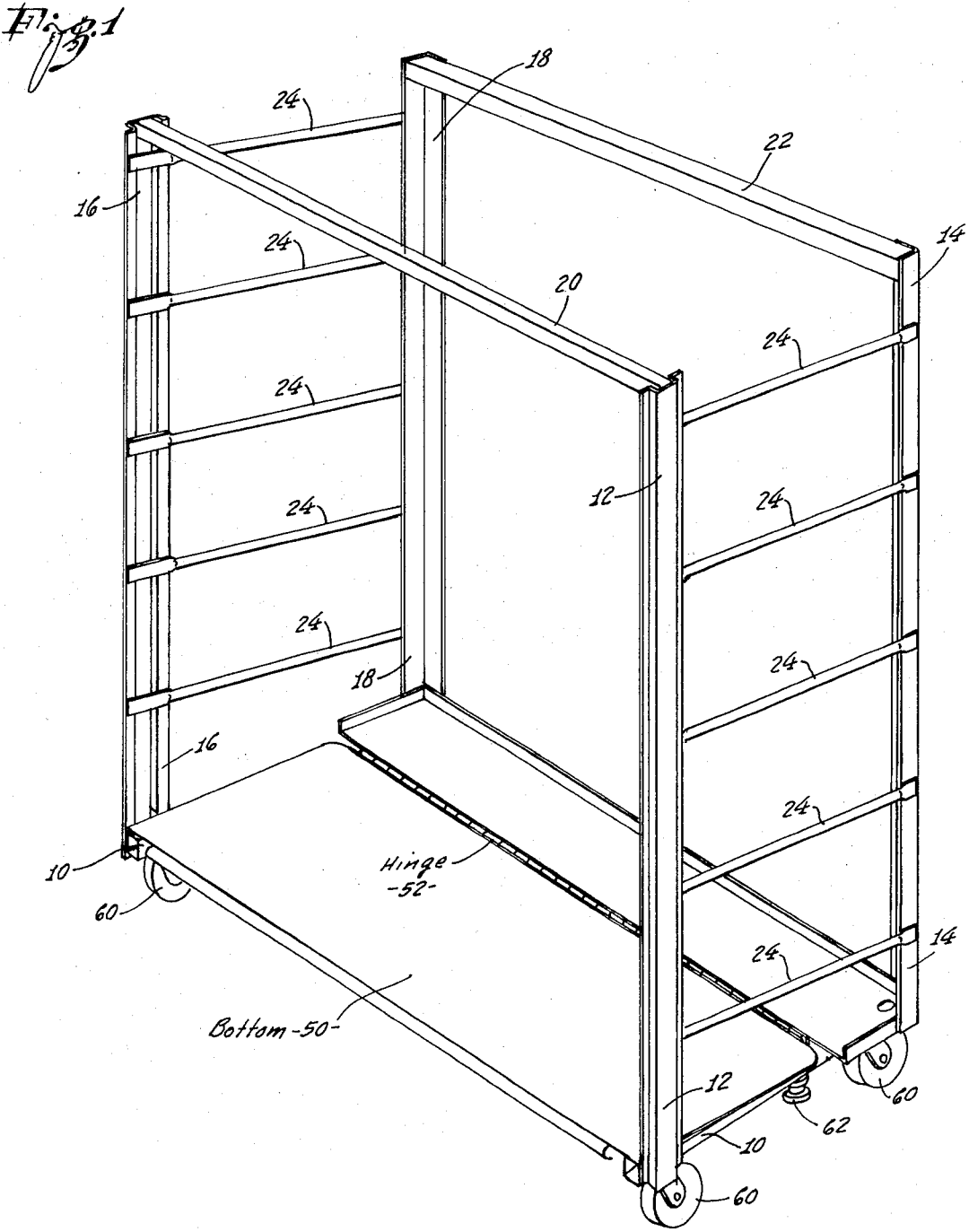

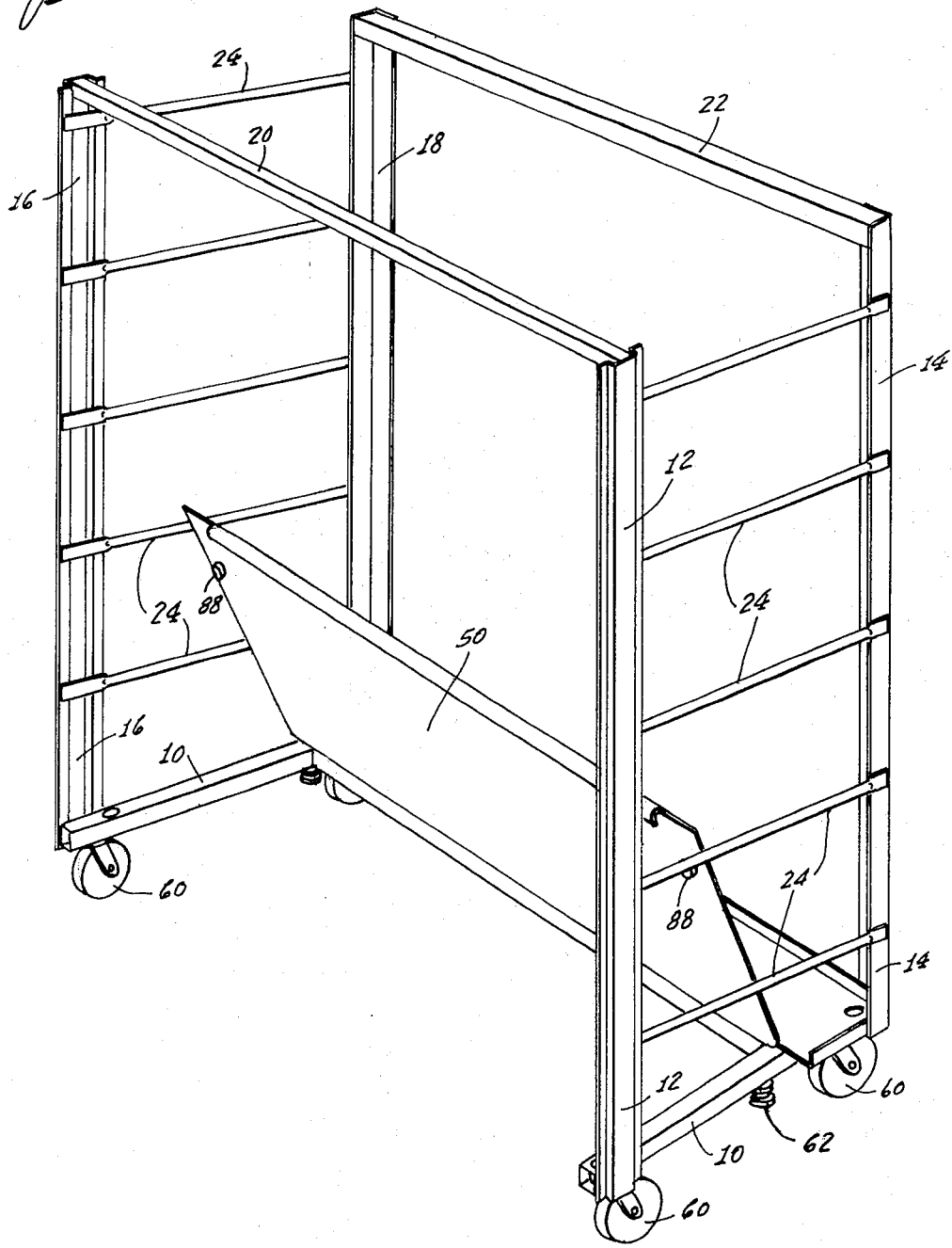

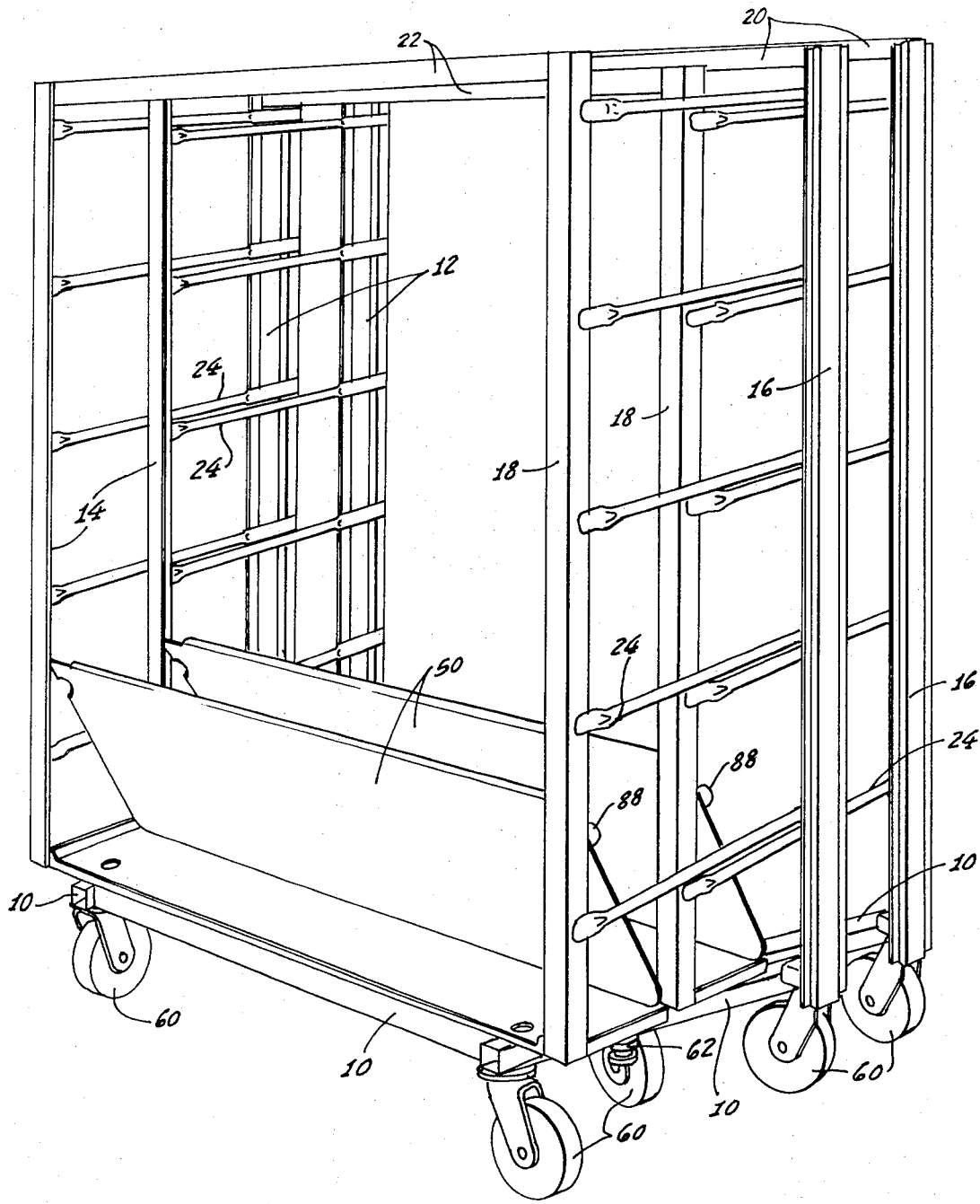

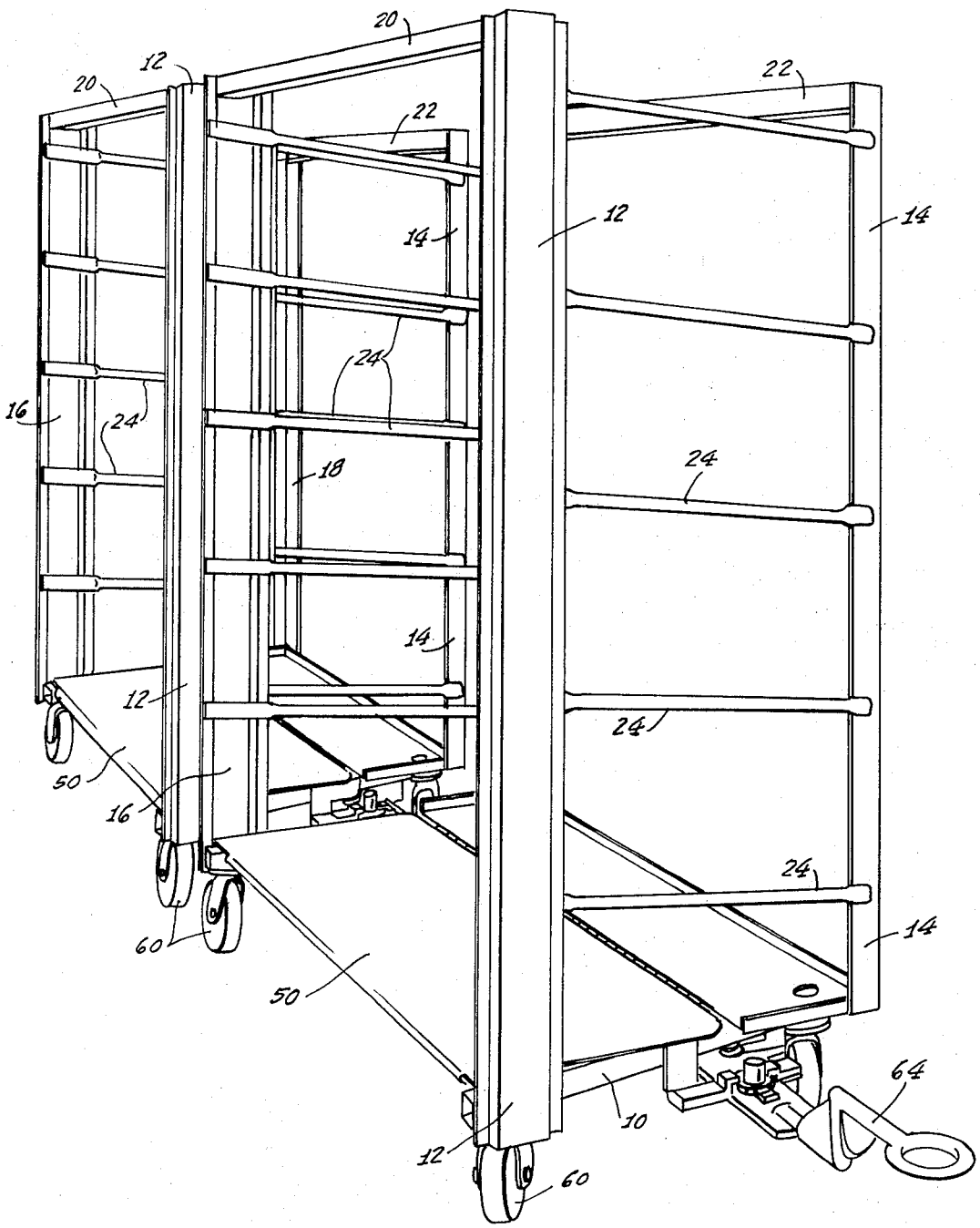

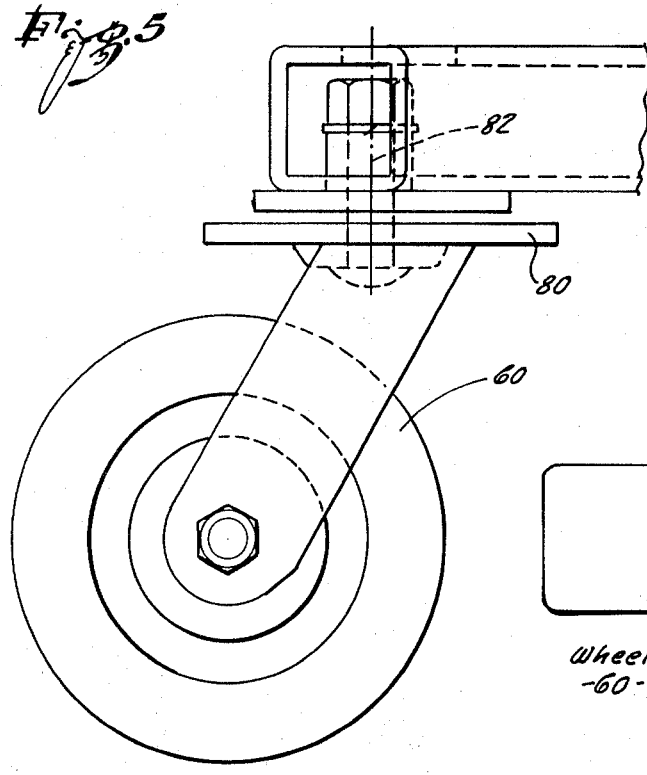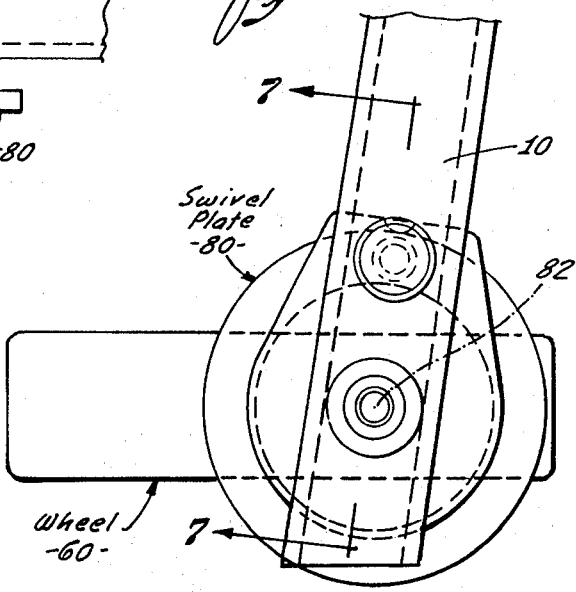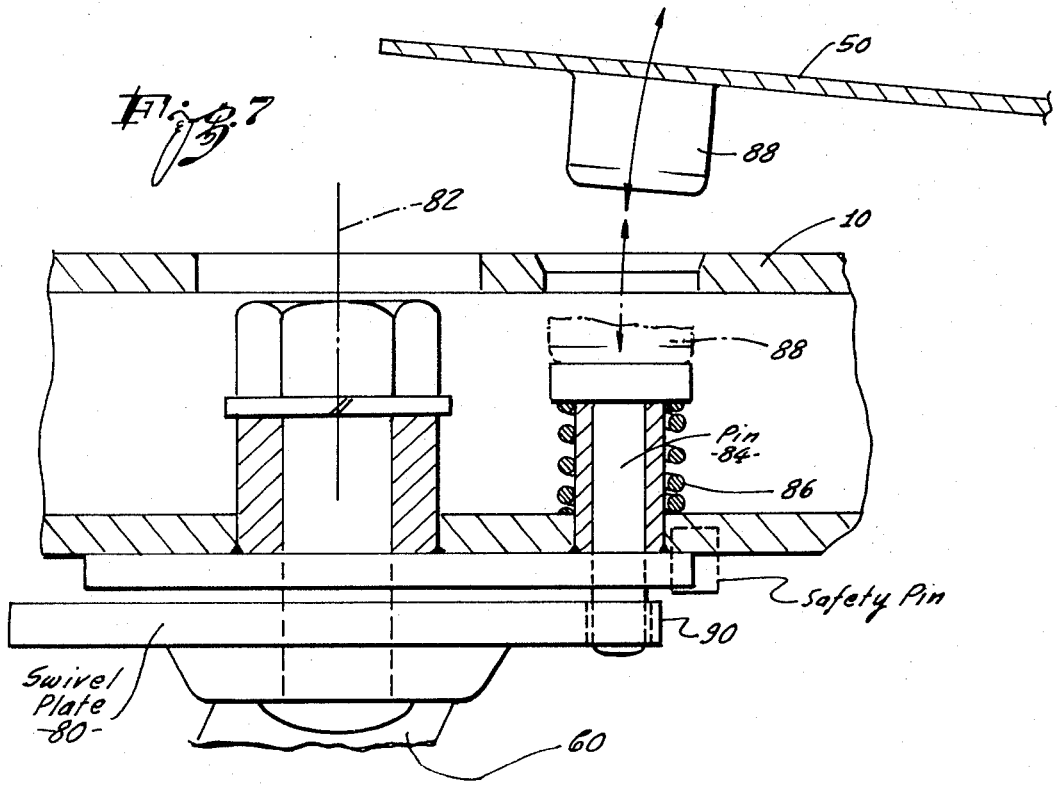

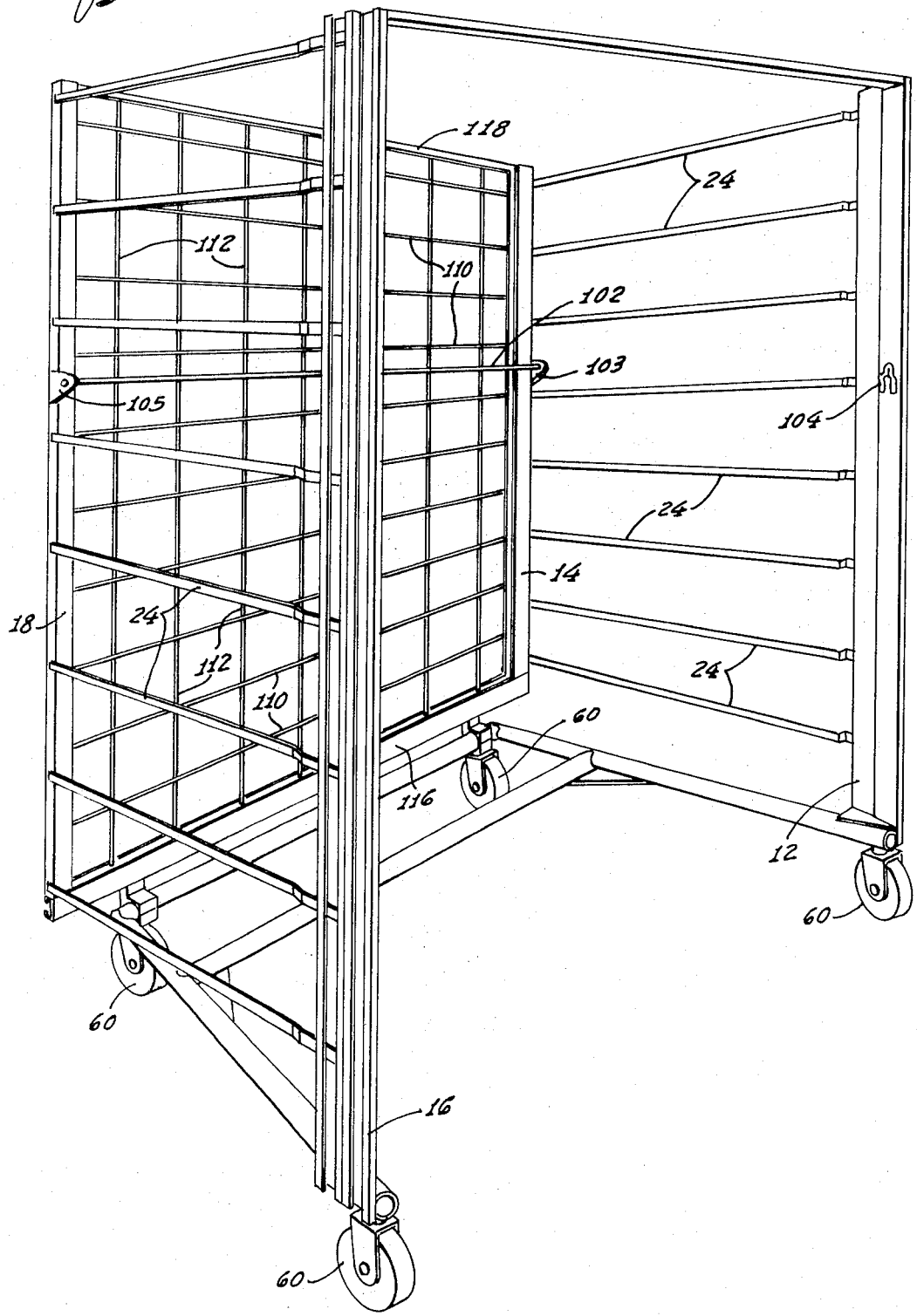

TRANSPORT CART

BACKGROUND OF THE INVENTION

As mentioned above, the improved transport cart of the invention has particular utility in conjunction with warehouses for transporting groceries, or other goods. To conserve space it is particularly constructed so that it may be nested with similar carts when empty. In addition, the cart is constructed so that it may be towed without drifting.

With respect to the nesting feature of the cart, the structure is generally similar to the wheeled rack described in U.S. Pat. No. 2,928,681. However, it will become evident as the description proceeds that the transport cart of the present invention is modified with respect to the rack described in the patent, so as to permit it to perform its intended purpose in carrying commodities.

BRIEF DESCRIPTION OF THE DRAWINGS

FIG. 1 is a perspective representation of a transport cart constructed to incorporate the concepts of the present invention, the cart of FIG. 1 having a bottom with a hinged section and illustrated in its down position;

FIG. 2 is a representation similar to FIG. 1, but showing the hinged bottom in its up position;

FIG. 3 illustrates two carts, such as the cart of FIGS. 1 and 2, and shows the manner in which the carts may be nested into one another, when not in use;

FIG. 4 shows the two carts of FIG. 3 coupled to one another so as to constitute a train, which may be towed by an appropriate truck;

FIG. 5 is a side elevation of one of the casters of the cart of the invention;

FIG. 6 is a plan view of the caster of FIG. 5;

FIG. 7 is a section of the caster assembly taken along the lines 7—7 of FIG. 6; and FIGS. 8 and 9 are perspective representations of a second embodiment of the transport cart.

DETAILED DESCRIPTION OF THE ILLUSTRATED EMBODIMENT

Figure 9:
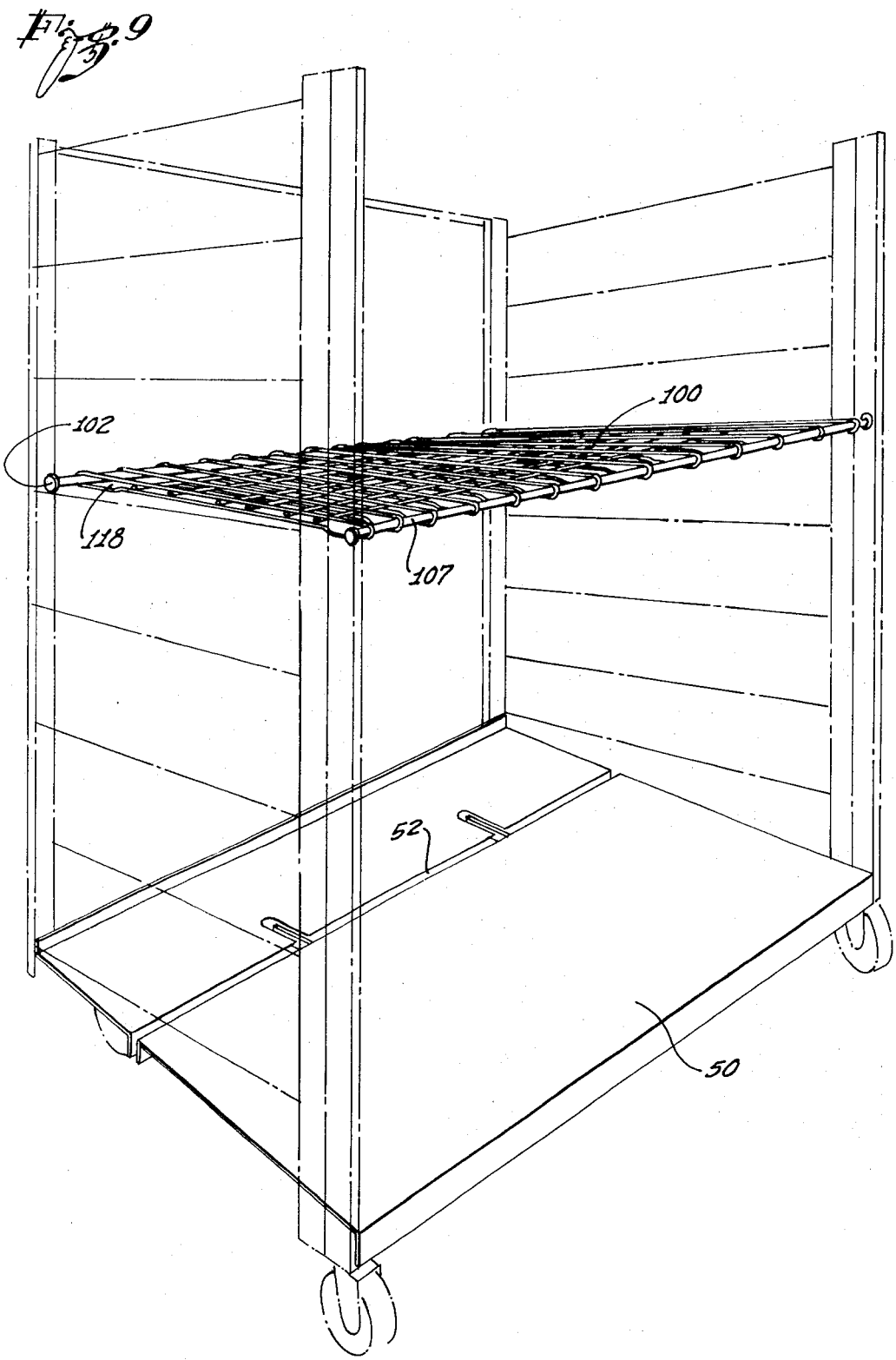

As shown in FIGS. 1, 2 and 3, the transport cart of the invention includes a lower frame member 10 having a U-shaped configuration with side legs diverging outwardly from one side of the cart to the other. The frame 10 defines an open side at the left hand side of the cart in FIGS. 1 and 2, and a closed side defined by a bight portion of the frame, shown, for example, in FIG. 3.

Four upright posts 12, 14, 16 and 18 are attached to the lower frame member 10 at the four corners of the cart, and these posts extend upwardly, as shown. A pair of transverse braces 20 and 22 extend across the upper ends of the posts 12, 16 and 14, 18, respectively. A plurality of spaced and parallel elongated members 24 extend between the posts 12, 14 and 16, 18 at each end of the cart. These elongated members are slanted downwardly from the open side to the closed side of the cart, so as to permit the cart to be nested into a similar cart, when not in use, as shown in FIG. 3.

The transport cart of FIGS. 1 and 2 includes a flat bottom member 50 which is supported on the lower frame member 10, and which has one section hinged to another section by means of a hinge 52, so that a section of the bottom may be turned to an up position or to a down position. When the bottom 50 is turned to its up position, the cart may be nested into similar carts, as shown in FIG. 3. As mentioned above, the bottom is shown in its down position in FIG. 1, and in its up position in FIG. 2.

A plurality of casters 60 are suspended from the lower frame member 10. A coupling post 62 is also suspended from the lower frame member to permit the cart to be coupled to other similar carts, as shown in FIG. 4, so that the carts may be towed as a train, for example, by an appropriate truck. The carts are coupled to one another for this purpose by means of a yoke 64 at the front end of the cart which may be coupled to the post 62 on a forward cart, the yoke of the front cart being coupled to the aforesaid truck.

In order to prevent the carts from drifting when towed in the train shown in FIG. 4, a locking pin assembly is provided, such as shown in FIGS. 5, 6 and 7, in which at least one of the casters 60 is attached to a horizontal swivel plate 80 which rotates, with the caster, about a swivel axis 82. A pin 84 is supported on the frame member 10, and it is spring loaded by a spring 86. A post 88 is affixed to the underside of the hinged section of the bottom 50, and the post is received in a hole in the frame 10, so that when the bottom is turned to the down position, the post engages the upper end of the spring loaded pin 84.

The post then moves the pin against the resilient bias of its spring 86 against the top surface of the swivel plate 80. When the caster 60 is turned to its aligned position with respect to the cart, a hole or depression 90 in the swivel plate 80 is aligned with the pin 84 to receive the pin, so that the caster is locked in its particular position. It has been found that there is no need to provide a lock for more than one of the casters of the cart so as to achieve the desired purpose of preventing drift when the carts are towed as a train in the warehouse.

When the cart is again empty, and the hinged section of the bottom 50 is turned to its up position of FIG. 2, the spring 86 returns the pin 84 to its disengaged position, so that the casters 60 of FIGS. 5–7 is again free to swivel.

The embodiment of FIGS. 8 and 9 is generally similar to the embodiment of FIG. 1. However, in the latter embodiment a rear wall is formed of a plurality of transverse wires 110 and 112 which are welded to one another and which extend between the posts 14 and 18, and between upper and lower braces 116 and 118. The latter embodiment also includes a shelf 100 which may be formed, for example, of a wire mesh.

The shelf is pivotally supported on a rod 102 which extends between brackets 103 and 105 to be spaced slightly from the rear wall of the cart. The shelf 100 pivots downwardly, and it includes a forward rod 107 which engages clips, such as the clip 102, formed in the posts 12 and 16. The shelf 100 has a feature, in that when it is turned back to its vertical position, the rod 102 slides in a rear slot 118 in the shelf, so that the shelf is held firmly in the upright position, and does not tend to turn down to its horizontal position.

To turn the shelf down to its horizontal position, it must first be moved upwardly, until the rod 102 reaches the lower end of the slot 118, and then the shelf can be turned down. In this respect, it should also be noted that the bottom 50 turns back on its hinge 52 to a position beyond the vertical, so that the bottom may rest against the rear of the cart when in its uppermost position, without any tendency to fall back to its horizontal position.

The invention provides, therefore, improved transport carts for use in warehouses, or the like. The transport carts of the invention may be nested with similar carts when not in use. Also, the transport carts of the invention include an improved caster locking mechanism which automatically engages when the carts are loaded, and which prevents drift of the carts when towed as a train with other carts in the warehouse. Also, the second embodiment of the transport cart includes a shelf which may conveniently be turned to an upper stable vertical position when not in use.

It will be appreciated that while particular embodiments of the invention have been shown and described, modifications may be made. It is intended in the following claims to cover all modifications which come within the spirit and scope of the invention.

What is claimed is:

1. A transport cart comprising: a lower frame member; a plurality of casters swivelly suspended from said bottom frame member about respective vertical swivel axes; a bottom mounted on said lower frame member and having a hinged section adapted to be turned to a down position and to an up position; pin means positioned on said lower frame to be engaged by said bottom and being moved thereby into engagement with at least one of said casters to lock said caster in a predetermined angular position with respect to its vetical swivel axis when the bottom is in its down position.

2. The transport cart defined in claim 1 and which includes spring means coupled to said pin for biasing said pin to a disengaged position with respect to said caster; and a post mounted on said bottom in position to engage said pin and move said pin against the bias of said spring means into engagement with said caster when said bottom is in its down position.

3. The transport cart defined in claim 2 and which includes a horizontal swivel plate affixed to said caster for rotation about the vertical swivel axis thereof, said plate having an aperture for receiving said pin when the plate is turned to a particular angular position about said vertical swivel axis.

4. The transport cart defined in claim 1 in which said lower frame member has side legs diverging outwardly from one side to the other of the cart and defining an open side; four upright posts attached to the lower frame member; and a plurality of spaced and parallel elongated members extending between the upright posts at each end of the cart.

5. The cart defined in claim 4 in which said spaced and parallel elongated members are slanted downwardly from the open side of said lower frame member, whereby said transport cart may be nested into a similar transport cart when the bottom of the similar cart is turned to its up position.

6. The cart defined in claim 4, and which includes a horizontal elongated support bracket attached to an intermediate position on two of said upright posts, and a shelf pivotally mounted on said support bracket, said shelf having a rear slotted section to permit a sliding movement of the shelf on said support bracket when the shelf is in a vertical position.

* * * * *